United States Patent
Ikemoto

(10) Patent No.: US 6,401,019 B2
(45) Date of Patent: Jun. 4, 2002

(54) ELECTRIC POWER STEERING APPARATUS

(75) Inventor: Katsuya Ikemoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/760,771

(22) Filed: Jan. 17, 2001

(30) Foreign Application Priority Data

Jan. 19, 2000 (JP) .................................. 2000-010627

(51) Int. Cl.⁷ .................................................. B60J 8/32
(52) U.S. Cl. .......................... 701/41; 180/204; 180/443
(58) Field of Search ............................ 701/41, 48–79, 701/36; 180/443, 447, 204

(56) References Cited

U.S. PATENT DOCUMENTS

| | | | | |
|---|---|---|---|---|
| 4,573,705 A | * | 3/1986 | Kanai et al. ................. 280/708 |
| 5,381,336 A | * | 1/1995 | Shorkey ....................... 701/41 |
| 5,428,537 A | * | 6/1995 | Kamono et al. ............... 701/41 |
| 5,740,040 A | * | 4/1998 | Kifuku et al. ................. 701/41 |
| 5,749,431 A | * | 5/1998 | Peterson ...................... 180/422 |
| 5,904,223 A | * | 5/1999 | Shimizu et al. ............... 180/443 |
| 6,018,692 A | * | 1/2000 | Shimizu et al. ............... 701/41 |
| 6,041,887 A | * | 3/2000 | Kojo et al. ................... 180/446 |
| 6,064,931 A | * | 5/2000 | Sawada et al. |
| 6,131,693 A | * | 10/2000 | Mukai et al. ................. 180/446 |
| 6,154,696 A | * | 11/2000 | Nishi et al. |
| 6,212,453 B1 | * | 4/2001 | Kawagoe et al. ............. 701/41 |
| 6,239,568 B1 | * | 5/2001 | Sugitani et al. .............. 318/466 |
| 6,240,350 B1 | * | 5/2001 | Endo ........................... 701/41 |
| 6,272,403 B2 | * | 8/2001 | Sugitani et al. ............... 701/1 |
| 6,275,754 B1 | * | 8/2001 | Shimizu et al. |

FOREIGN PATENT DOCUMENTS

JP          63-788878          4/1988

* cited by examiner

Primary Examiner—William A. Cuchlinski, Jr.
Assistant Examiner—Olga Hernandez
(74) Attorney, Agent, or Firm—Sughrue Mion, PLLC

(57) ABSTRACT

Even when a vehicle is rapidly decelerated, an electric power steering apparatus can provide a steering torque corresponding to such a deceleration of the vehicle, so that the vehicle can be steered in a stable manner without a steering wheel being adversely influenced by road surface irregularities. The apparatus includes a vehicle speed detecting unit for detecting a speed of the vehicle, a torque detecting unit for detecting steering torque, a deceleration calculating unit for calculating a deceleration of the vehicle from the vehicle speed detected by the vehicle speed detecting unit, a first assist force calculating unit for calculating a first assist force from the detection results of the vehicle speed detecting unit and the torque detecting unit, a second assist force calculating unit for calculating a second assist force in response to the deceleration calculated by the deceleration calculating unit, and a control unit for applying to the steering system an assist force which is a sum of the first assist force calculated by the first assist force calculating unit and the second assist force calculated by the second assist force calculating unit.

5 Claims, 14 Drawing Sheets

ELECTRIC POWER STEERING APPARATUS

CROSS REFERENCE TO RELATED APPLICATION

This application is based on application Ser. No. 2000-010627 filed on Jan. 19, 2000, the contents of which are hereby incorporated by reference.

BACKGROUND OF THE INVENTION

1. Field of the Invention

The present invention relates to an electric power steering apparatus for a vehicle capable of lightening the steering operation of an operator at the time of deceleration of the vehicle, and improving a deterioration in the steerability or maneuverability of a steering wheel caused by irregularities on road surfaces or the like during such a time, as well as improving a steering feeling or sensation of the operator.

2. Description of the Related Art

Conventionally, a variety of vehicle speed sensitive type electric power steering apparatuses have been proposed in which the heaviness in operation of a steering wheel by the operator during steering operation can be varied in response to vehicle speeds.

FIG. 13 is a schematic block diagram showing an arrangement of a conventional speed sensitive type electric power steering apparatus as disclosed in, for example, Japanese Patent Publication No. Hei 8-15865. FIG. 14 is a characteristic diagram for explaining the amount of power assist used in the conventional electric power steering apparatus. FIG. 15 is a conceptual diagram showing a steering mechanism employed in the conventional electric power steering apparatus. FIG. 16 illustrates an external appearance of a steering gear unit in an enlarged manner, employed in the conventional electric power steering apparatus.

In FIG. 13, the electric power steering apparatus includes a vehicle speed sensor 1 for sensing the driving or travelling speed of a vehicle, a torque sensor 2 for sensing steering torque applied to a steering wheel 9 (see FIG. 15) of a vehicle on which the apparatus is mounted, and a controller 3 for determining the amount of power assist given to the steering wheel by an actuator 5 in the form of an electric motor based upon the driving speed sensed by the vehicle speed sensor 1 and the steering torque sensed by the torque sensor 2. A driver 4 receives the power assist force as a control signal from the controller 3 and serves to drive/control the actuator 5 based thereon. A steering gear 6 is engaged with the output shaft of the actuator 5 for steering driven wheels of the vehicle.

As shown in FIG. 15, the actuator 5a is provided at its output shaft with a speed reducer 5a so that the output power of the actuator reduced by the speed reducer 5a is transmitted to a rack 6a which is meshed with the steering gear 6. A gear case 8 encloses the steering gear 6 and the rack 6a meshed with the steering gear 6. A steering force or torque applied to the steering wheel 9 by the vehicle operator is transmitted through the steering gear 6 to driven wheels 10.

As depicted in FIG. 14, in the conventional power steering apparatus employing the above arrangement, the rate of increase in the power assist force is variable so that it increases in accordance with the increasing steering torque when the vehicle speed is low, whereas it decreases in accordance with the increasing steering torque when the vehicle speed is high. As a result, in the high speed range, the power assist force is reduced to decrease the steering amount, so that the heaviness in operation of the steering wheel can be increased.

In the conventional vehicle speed sensitive type electric power steering apparatus, when the vehicle is rapidly decelerated, a greater portion of the vehicle load or weight is applied to the front wheels, thus giving rise to the following problem. That is, the electric power steering apparatus is subject to an adverse influence due to irregularities on the road surfaces so that the steering wheel becomes liable to be forced to move unintentionally. As a result, the steering characteristic of the vehicle is deteriorated.

SUMMARY OF THE INVENTION

The present invention is intended to obviate the above-described problem, and therefore, has an object to provide an electric power steering apparatus for a vehicle which is capable of lightening the heaviness in operation of the steering wheel in response to a deceleration of the vehicle, and of improving the steering characteristic and the steering feeling or sensation of the operator when a vehicle speed is rapidly reduced.

Bearing the above object in mind, according to the present invention, there is provided an electric power steering apparatus for a vehicle for applying an assist force to a steering system so as to increase an operator's induced steering force, the apparatus comprising a vehicle speed detecting unit for detecting a speed of the vehicle, a torque detecting unit for detecting steering torque, a deceleration calculating unit for calculating a deceleration of the vehicle from the vehicle speed detected by the vehicle speed detecting unit, a first assist force calculating unit for calculating a first assist force from the detection results of the vehicle speed detecting unit and the torque detecting unit, a second assist force calculating unit for calculating a second assist force in response to the deceleration calculated by the deceleration calculating unit, and a control unit for applying to the steering system an assist force which is a sum of the first assist force calculated by the first assist force calculating unit and the second assist force calculated by the second assist force calculating unit.

In a preferred form of the invention, the electric power steering apparatus further comprises a brake detecting unit for detecting a braking operation by an operator of the vehicle, and when the brake detecting unit detects the braking operation by the operator, the deceleration calculating unit calculates the deceleration of the vehicle.

In another preferred form of the invention, the electric power steering apparatus further comprises a vehicle load detecting unit for detecting a vehicle load applied to a front wheel of the vehicle, and a third assist force calculating unit for calculating a third assist force in response to the vehicle load. The control unit applies to the steering system an assist force which is a total sum of the third assist force calculated by the third assist force, the first assist force and the second assist force.

In a further preferred form of the invention, the electric power steering apparatus further comprises a deceleration threshold value calculating unit for calculating a deceleration threshold value in response to a vehicle speed, and a second assist force calculation judging unit for judging as to whether or not the second assist force is to be added to the first assist force, based upon a comparison result between the deceleration calculated by the deceleration calculating unit and the deceleration threshold value calculated by the deceleration threshold value calculating unit.

In a still further preferred form of the invention, the electric power steering apparatus further comprises a vehicle load threshold value calculating unit for calculating a vehicle load threshold value in response to a vehicle speed, and a third assist force calculation judging unit for judging as to whether or not the third assist force is to be added to the sum of the first assist force and the second assist force based upon a comparison result between the vehicle load detected by the vehicle load detecting unit and the vehicle load threshold value calculated by the vehicle load threshold value calculating unit.

BRIEF DESCRIPTION OF THE DRAWINGS

A better understanding of the present invention will be made of reading the following detailed description of the invention in conjunction with the accompanying drawings, in which.

DETAILED DESCRIPTION OF THE PREFERRED EMBODIMENTS

Preferred embodiments of the present invention will now be described with reference to accompanying drawings.
Embodiment 1

Figure 1:
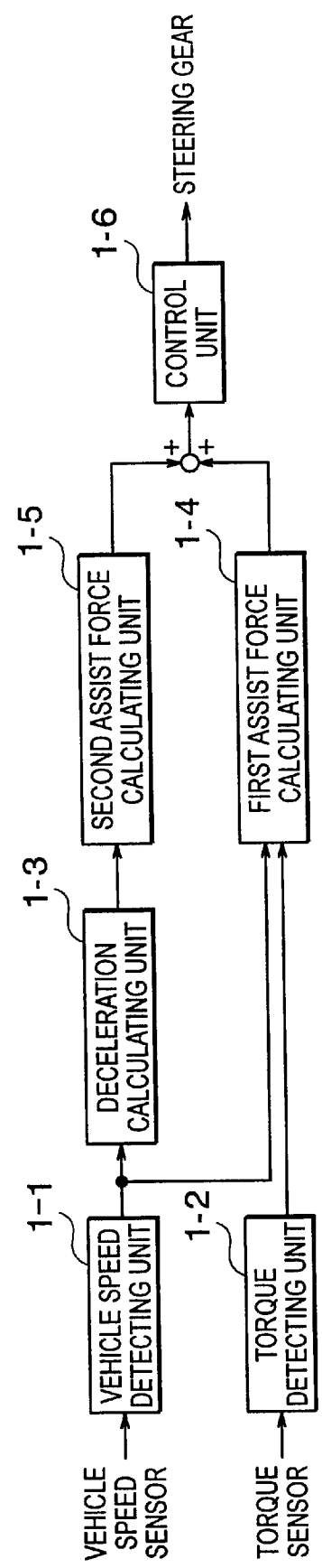
FIG. 1 is a structural diagram of an electric power steering apparatus according to a first embodiment of the present invention.
Figure 15:
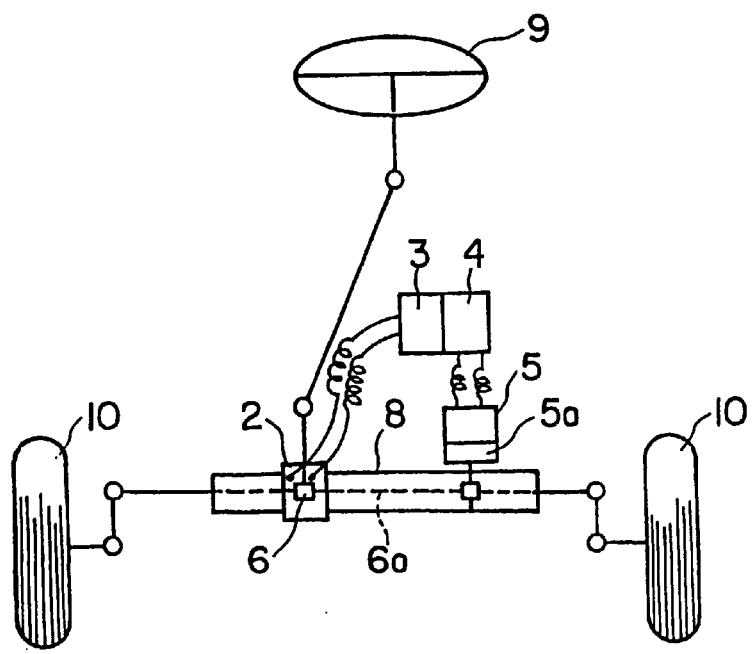
FIG. 15 is a conceptual diagram of a steering mechanism employed in the conventional electric power steering apparatus.
Figure 16:
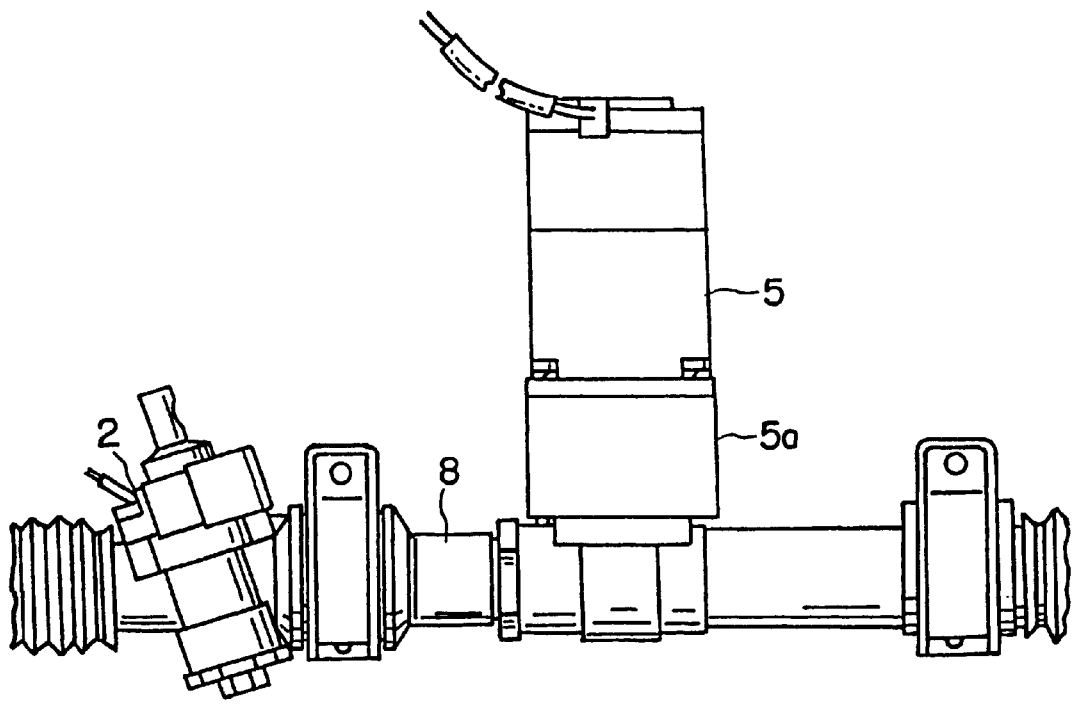
FIG. 16 shows an outer appearance of a steering gear unit of the conventional speed sensitive type electric power steering apparatus.

FIG. 1 schematically shows an arrangement of an electric power steering apparatus for a vehicle according to a first embodiment of the present invention. In FIG. 1, the electric power steering apparatus includes a vehicle speed detecting unit 1-1 for detecting the speed of a vehicle on which the electric power steering apparatus is installed, a torque detecting unit 1-2 for detecting steering torque, i.e., torque of a steering wheel generated when a vehicle operator steers the steering wheel, and a deceleration calculating unit 1-3 for calculating a deceleration of the vehicle based on the vehicle speed detected by the vehicle speed detecting unit 1-1, a first assist force calculating unit 1-4 for calculating a first assist force of the steering wheel based on both the vehicle speed detected by the vehicle speed detecting unit 1-1 and the torque detected by the torque detecting unit 1-2, a second assist force calculating unit 1-5 for calculating a second assist force based on the calculation result of the deceleration calculating unit 1-3, and a control unit 1-6 for driving and controlling an actuator based upon a sum of the first assist force and the second assist force, which are calculated by the first assist force calculating unit 1-4 and the second assist force calculating unit 1-5, respectively. As illustrated in FIG. 15, the actuator serves to apply a steering support force via a steering gear to the steering wheel.

The operation of the electric power steering apparatus according to the first embodiment will now be explained in detail.

Based on the output signal from the vehicle speed sensor, the vehicle speed detecting unit 1-1 calculates the vehicle speed. Also, based on the output signal from the torque sensor, the torque detecting unit 1-2 detects a steering torque given to the steering wheel. Next, the deceleration calculating unit 1-3 calculates a change in the vehicle speed per unit time of the vehicle based upon the vehicle speed calculation result obtained from the vehicle speed calculating unit 1-1 so as to provide a declaration of the vehicle. In addition, the first assist force calculating unit 1-4 calculates a first assist force corresponding to the vehicle deceleration based upon the vehicle speed detected by the vehicle speed detecting unit 1-1 and the torque detected by the torque detecting unit 1-2, while using the vehicle speed and the steering torque as parameters, as shown in FIG. 2.

Figure 2:
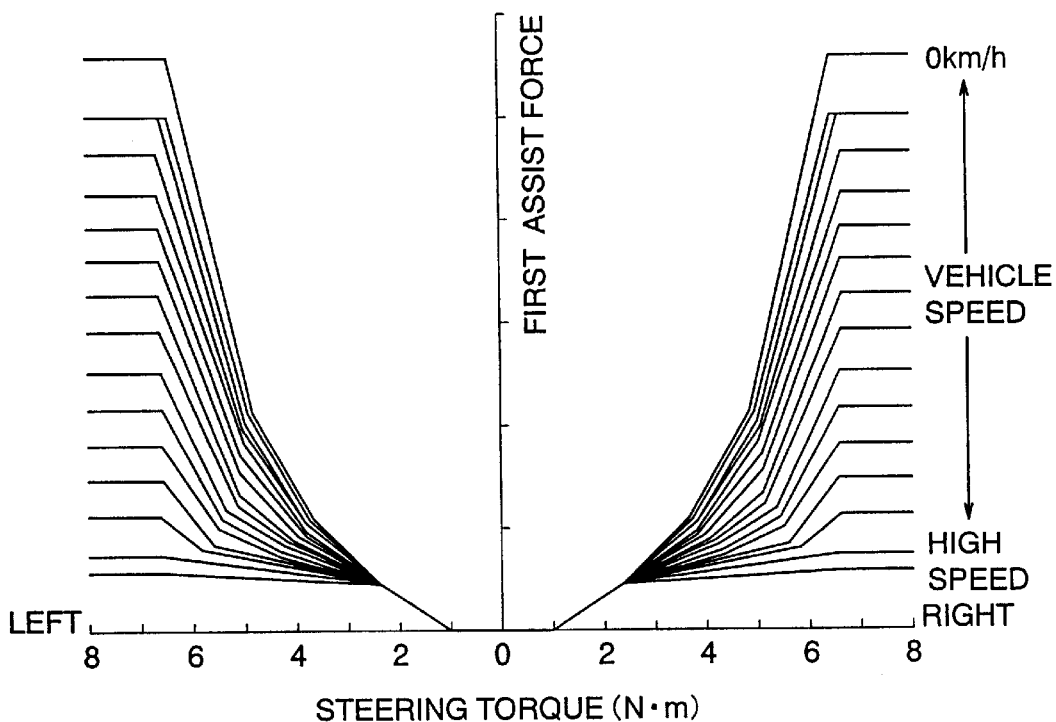
FIG. 2 is a graphic representation showing a first assist force calculating map of the electric power steering apparatus according to the first embodiment of the present invention.

In FIG. 2, polygonal lines represent a plurality of typical vehicle speeds, and intermediate vehicle speed values between the adjacent typical vehicle speeds are obtained by interpolating the adjacent typical vehicle speeds. It should also be noted that as illustrated in FIG. 2, a relationship between the typical vehicle speeds and the first assist force obtained from the vehicle speed and the steering torque is stored as a map in the first assist force calculating unit 1-4. As a result, both a steering torque value and a vehicle speed value detected upon the vehicle being decelerated are inputted into the first assist force calculating unit 1-4, which then calculates a proper assist force based on these input values.

Figure 3:
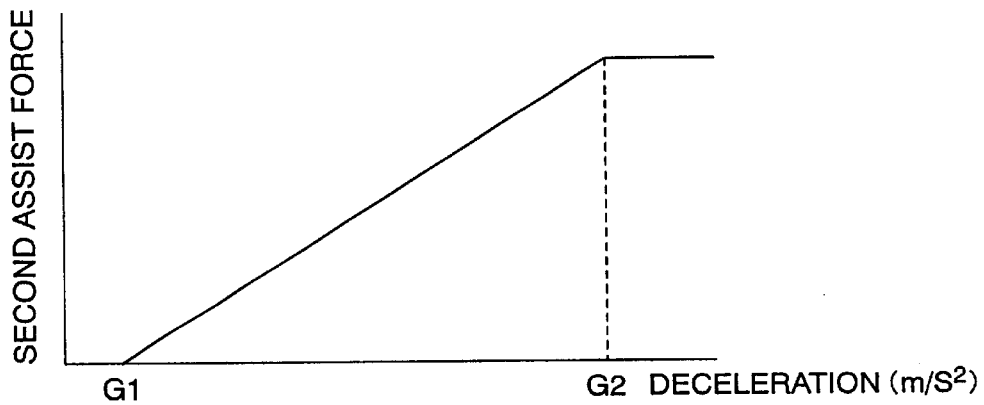
FIG. 3 is a graphic representation showing a second assist force calculating map of the electric power steering apparatus according to the first embodiment of the present invention.

Also, in the second assist force calculating unit 1-5, a second assist force which is determined based on a deceleration ($m/s^2$) is set as a map as shown in, for example, an increase characteristic indicated in FIG. 3. In FIG. 3, in such a case that the deceleration (m/s$^2$) calculated by the deceleration calculating unit 1-3 is lower than a predetermined deceleration G1, a calculation result obtained by the second assist force calculating unit 1-5 becomes 0. When the deceleration is higher than or equal to a predetermined deceleration G2 (G2>G1), a second amount when the vehicle is decelerated becomes constant, thus preventing the steering wheel operation from being made extremely light, and hence the steering feeling or sensation from being impaired.

As previously described in detail, since the assist force is controlled based on the steering torque, the vehicle speed and the deceleration, the assist force may be increased according to the present invention even when the vehicle speed is decreased under the neutral condition of the steering wheel so that steering operation of the steering wheel is adversely affected by road surface irregularities in the conventional electric power steering apparatus. As a consequence, the steerability or steering characteristic can be improved even in the above-described bad condition by the electric power steering apparatus according to the present invention.

The control unit 1-6 drives and controls the actuator in accordance with an assist force which is a sum of the first assist force determined by the first assist force calculating unit 1-4 and the second assist force determined by the second assist force calculating unit 1-5.

Embodiment 2

Figure 4:
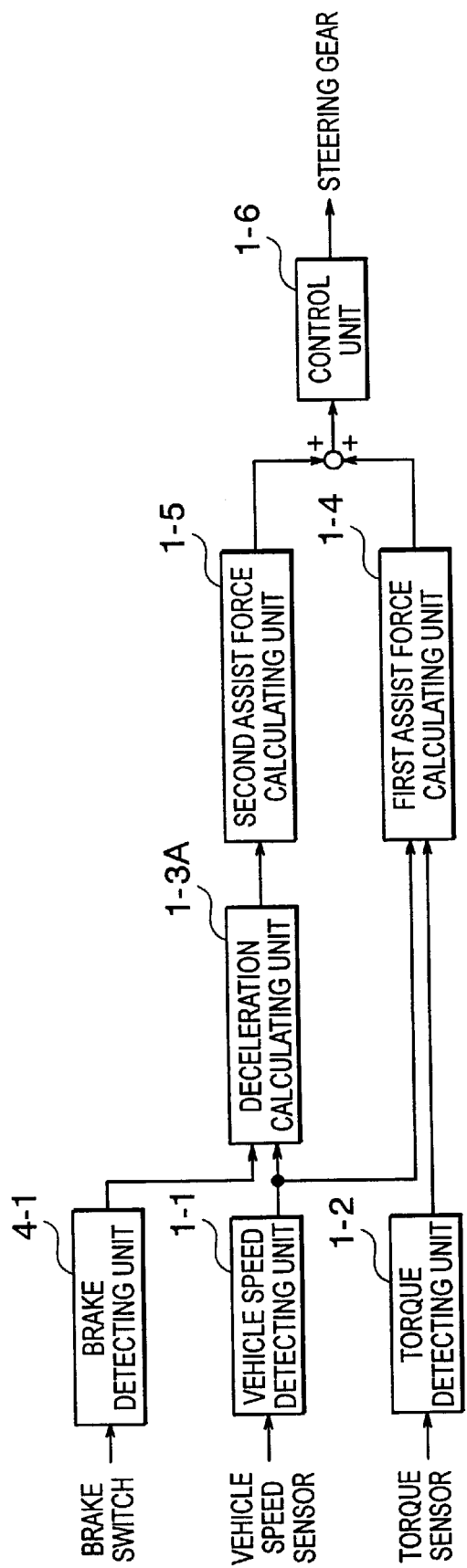
FIG. 4 is a structural diagram of an electric power steering apparatus according to a second embodiment of the present invention.

An electric power steering apparatus for a vehicle according to a second embodiment of the present invention will next be described. FIG. 4 is a structural diagram of the electric power steering apparatus according to the second embodiment. It should be noted that the same reference numerals used in FIG. 1 will be employed for designating the like or corresponding circuit components of this electric power steering apparatus.

As shown in FIG. 4, the electric power steering apparatus includes, in addition to elements 1-1, 1-2, 1-4 through 1-6 as employed in the first embodiment, a deceleration calculating unit 1-3A and a brake detecting unit 4-1 for judging as to whether or not a vehicle operator operates a brake. In accordance with this embodiment, the deceleration calculating unit 1-3A calculates a deceleration of the vehicle based upon a vehicle speed detection result when the brake detecting unit 4-1 judges that the vehicle operator operates a brake. In this case, the vehicle deceleration is calculated based upon a change in the vehicle speed per unit time, which is acquired by the vehicle speed detecting unit 1-1.

Subsequently, in a similar manner to the first embodiment, a first assist force calculated by the first assist force calculating unit 1-4 is added to a second assist force calculated by the second assist force calculating unit 1-5 so as to obtain a total assist force. Then, a control unit 1-6 drives an actuator in accordance with the calculated assist force.

Figure 5:
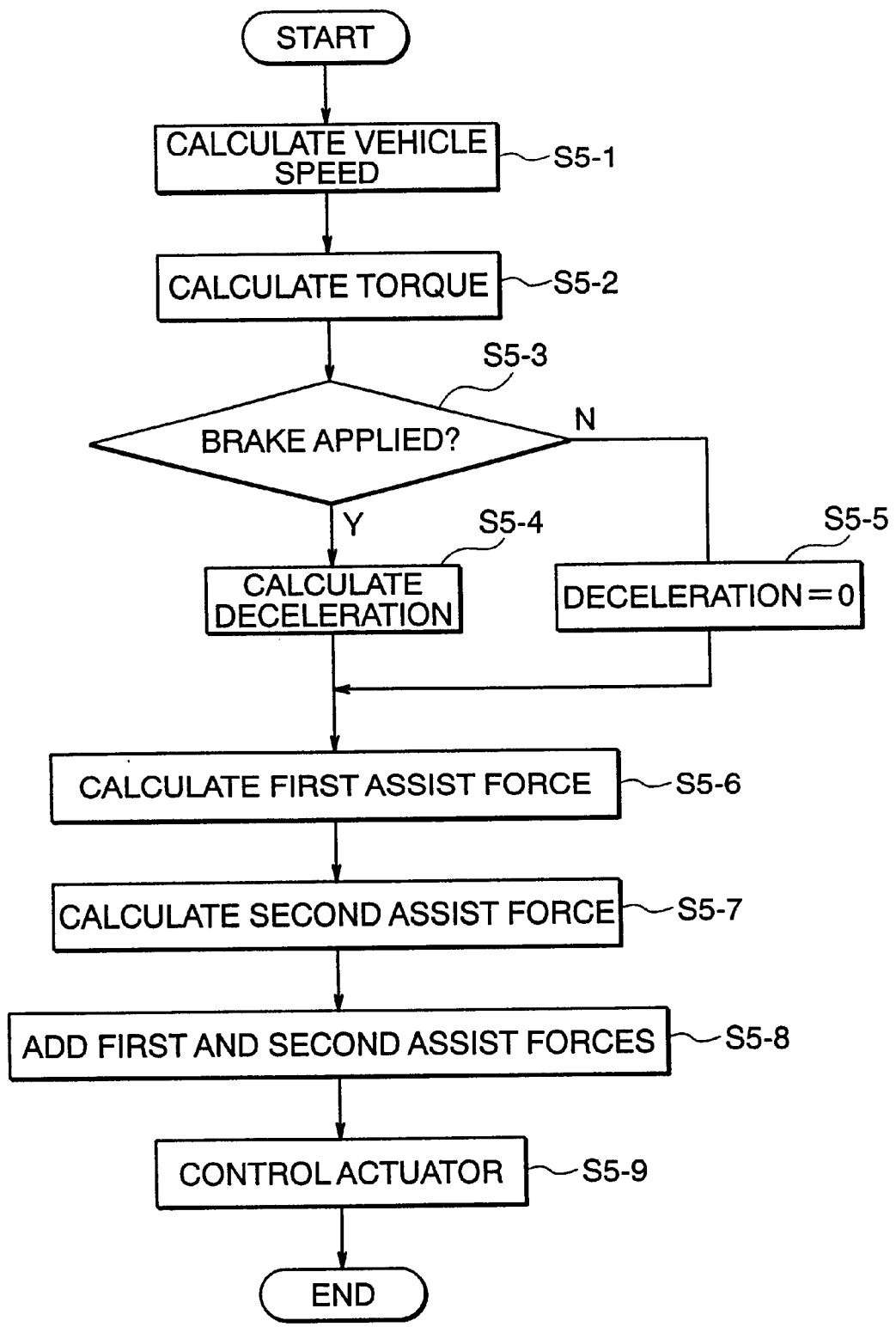
FIG. 5 is a flow chart for describing an operation of the electric power steering apparatus according to the second embodiment of the present invention.

FIG. 5 is a flow chart for describing the operation of the electric power steering apparatus according to the second embodiment.

First, the vehicle speed detecting unit 1-1 calculates the speed of the vehicle based upon an output signal derived from the vehicle speed sensor (in step S5-1). The torque detecting unit 1-2 calculates a steering wheel torque of the vehicle based upon an output signal derived from the torque sensor (in step S5-2). At this time, the brake detecting unit 4-1 judges as to whether or not the vehicle operator brakes the vehicle based upon a brake signal derived from the brake switch (in step S5-3).

When it is judged in step S5-3 that the vehicle operator brakes the vehicle, the deceleration calculating unit 1-3A calculates a deceleration based upon the vehicle speed calculated in step S5-1 (in step S5-4). Then, the processing is advanced to a further step S5-6. The deceleration is calculated based upon a change in the vehicle speed per unit time.

To the contrary, when it is judged in step S5-3 that the vehicle operator does not brake the vehicle, the deceleration calculating unit 1-3A sets the deceleration to 0 (in step S5-5), and then the processing is advanced to a step S5-6.

In the step S5-6, the first assist force calculating unit 1-4 calculates a first assist force based upon the vehicle speed and the steering torque calculated in the steps S5-1 and S5-2, respectively, with reference to a map set in the first assist force calculating unit 1-4. When the first assist force is calculated, the second assist force calculating unit 1-5 calculates a second assist force based upon the deceleration (m/s$^2$) calculated in either the step S5-4 or the step S5-5 with reference to the map (in step S5-7).

After both the first assist force and the second assist force are calculated in the above-explained manner, these first and second assist forces are added to each other (in step S5-8). It should be noted that when the vehicle operator does not brake the vehicle, since the deceleration is equal to zero, the second assist force becomes equal to zero, and the calculation result in the step S5-8 is made of only the first assist force. However, when the vehicle operator brakes the vehicle, while performing the actuator control operation in step S5-9, an auxiliary or assist force comprising the added value of the first and second assist forces calculated in the step S5-8 is applied to the steering wheel, thus increasing the steering force.

Embodiment 3

Figure 6:
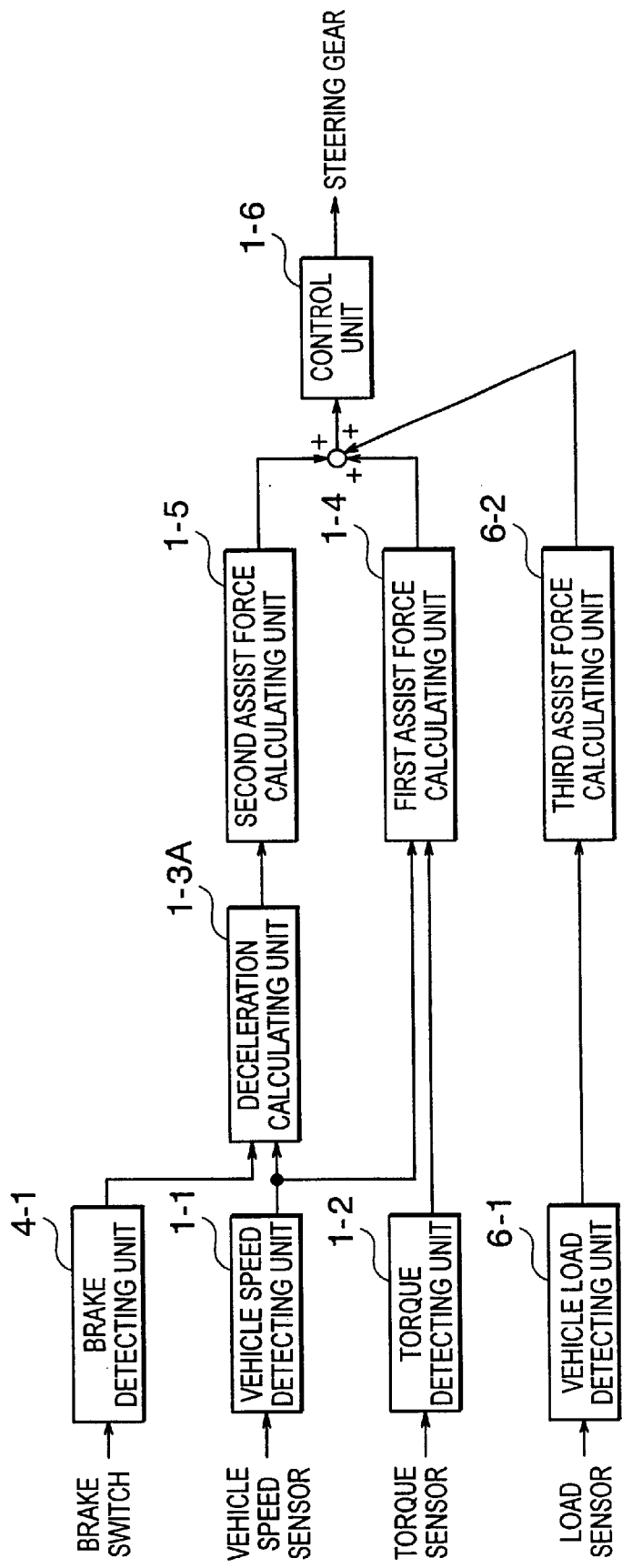
FIG. 6 is a structural diagram of an electric power steering apparatus according to a third embodiment of the present invention.

An electric power steering apparatus according to a third embodiment of the present invention will be described. FIG. 6 is a structural diagram of the electric power steering apparatus according to this embodiment. It should be noted that the same reference numerals used in FIG. 4 will be employed for designating the like or corresponding circuit components of the electric power steering apparatus.

As illustrated in FIG. 6, the electric power steering apparatus according to this embodiment includes, in addition to elements 1-1, 1-2, 1-3A, and 1-4 through 1-6 as employed in the second embodiment, a vehicle load detecting unit 6-1 and a third assist force calculating unit 6-2. The vehicle load detecting unit 6-1 detects a vehicle load or weight applied to a front wheel of the vehicle, this vehicle load being varied in dependence upon a road condition at the time when the vehicle operator brakes the vehicle. This road condition involves irregularities on a road surface of a bad road, a change in road slope or gradient, or the like. The third assist force calculating unit 6-2 calculates a third assist force which is determined in accordance with the vehicle load detected by the vehicle load detecting unit 6-1.

Figure 7:
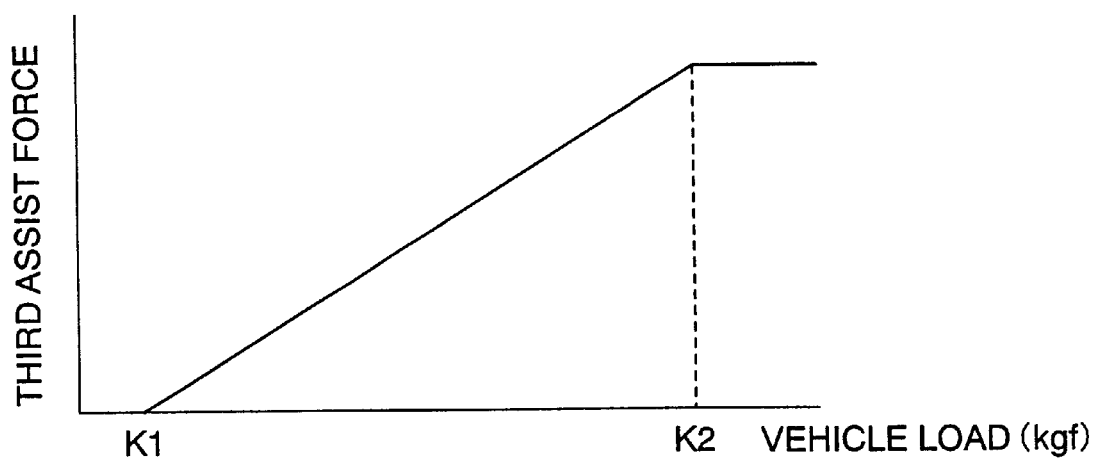
FIG. 7 is a graphic representation showing a third assist force calculating map of the electric power steering apparatus according to the third embodiment of the present invention.

For instance, as shown in FIG. 7, the third assist force is determined such that when the vehicle load on a front wheel is smaller than K1, the result of calculations made by the third assist force calculating unit 6-2 becomes zero. Also, when the vehicle load is larger than or equal to K2 (K2>K1), the third assist force while being loaded becomes constant. Even when a heavy weight or load is applied on a front wheel, it is possible to avoid that the steering operation of the steering wheel becomes extremely light, and also that the steering feeling or sensation is impaired.

The control unit 1-6 drives and controls the actuator in accordance with such an assist force which is a total sum of the first assist force of the first assist force calculating unit 1-4, the second assist force of the second assist force calculating unit 1-5, and the third assist force of the third assist force calculating unit 1-6.

Embodiment 4

Figure 8:
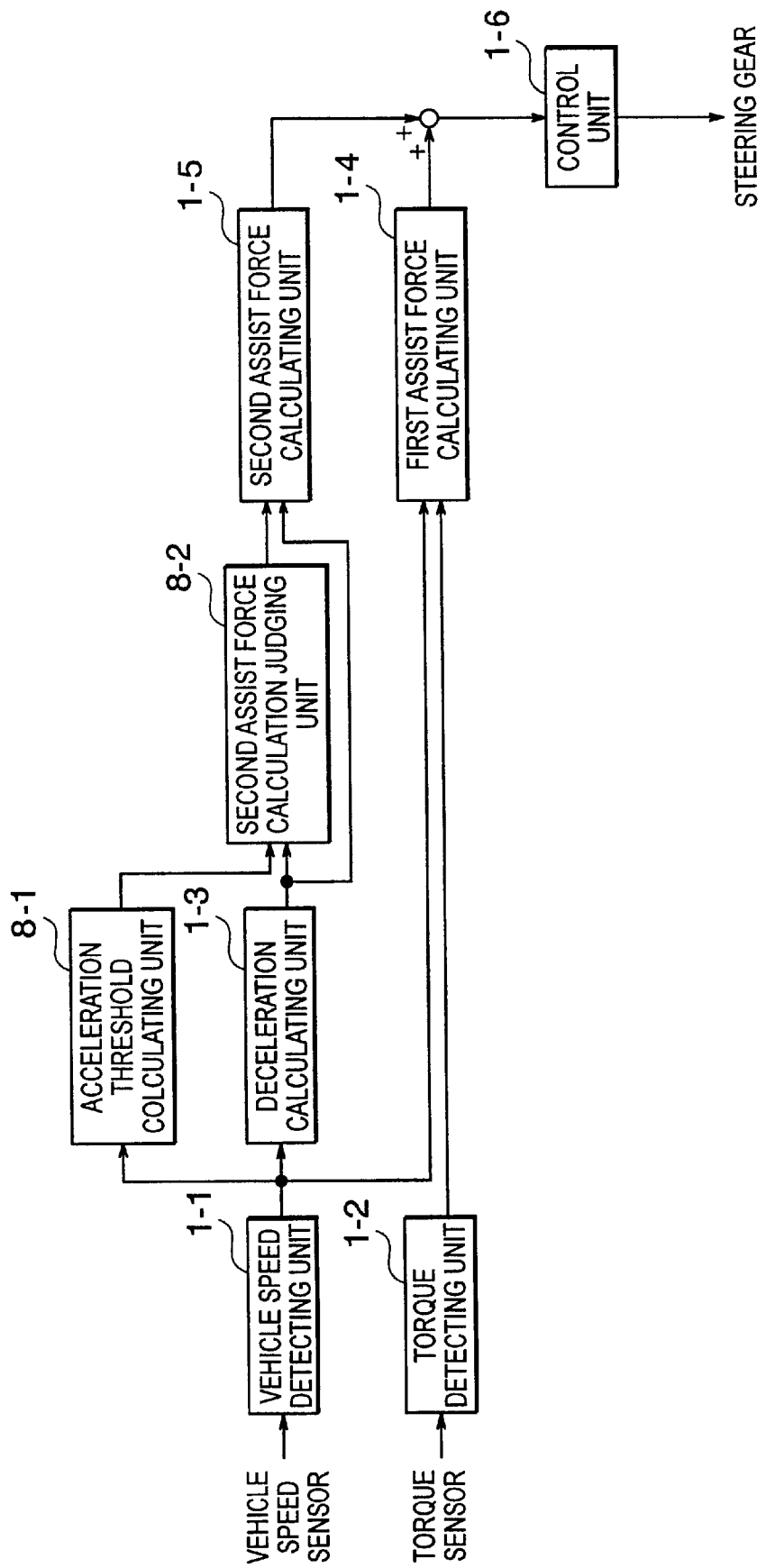
FIG. 8 is a structural diagram of an electric power steering apparatus according to a fourth embodiment of the present invention.

An electric power steering apparatus for a vehicle according to a fourth embodiment of the present invention will be described. FIG. 8 is a structural diagram of the electric power steering apparatus according to this embodiment. It should be noted that the same reference numerals used in FIG. 8 will be employed for designating the like or corresponding circuit components of this electric power steering apparatus.

Figure 9:
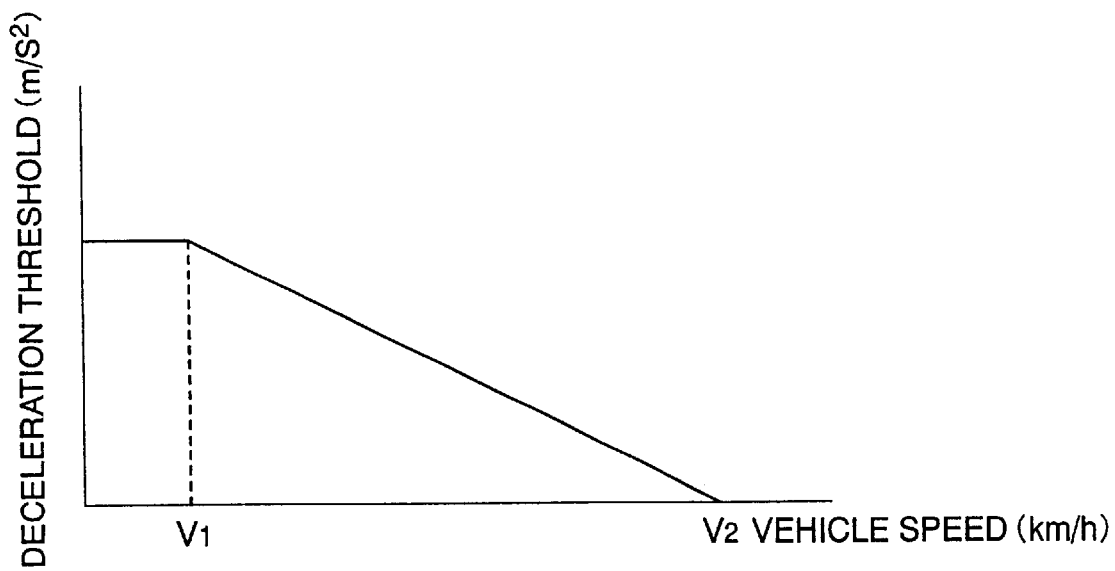
FIG. 9 is a graphic representation showing a fourth assist force calculating map of the electric power steering apparatus according to the fourth embodiment of the present invention.

In FIG. 8, the electric power steering apparatus according to this embodiment includes, in addition to elements 1-1 through 1-6 as employed in the first embodiment, a decelerating threshold value calculating unit 8-1 for calculating a deceleration threshold value from a vehicle speed detected by the vehicle speed detecting unit 1-1, and a second assist force calculation judging unit to be described later. FIG. 9 represents an example of a map used to calculate a deceleration threshold value. In FIG. 9, the higher the vehicle speed becomes, the larger the deceleration threshold value becomes. As a result, in order that when the vehicle speed is rapidly decreased while the vehicle is running at a high speed, the deceleration threshold value calculating unit 8-1 calculates a deceleration threshold value in accordance with the vehicle speed so as to determine whether or not an assist force is to be increased, the deceleration threshold value is increased so as not to unnecessarily increase the assist force when the vehicle is running at a high speed at which torque given to the steering wheel is small.

Also, the second assist force calculation judging unit 8-2 judges, based upon the deceleration and the deceleration threshold value, as to whether or not a second assist force is to be calculated, in accordance with the calculation result of the deceleration threshold value calculating unit 8-1, using the below-mentioned formula:

deceleration>deceleration threshold value.

In this case, when the deceleration is larger than the deceleration threshold value, as explained in the above-explained first embodiment, the second assist force calculating unit 1-5 calculates a second assist force based on the deceleration calculated by the deceleration calculating unit 1-3 while referring to a map. In this fourth embodiment, the deceleration G1 set as shown in FIG. 3 is set as the deceleration threshold value calculated by the deceleration threshold value calculating unit 8-1.

When a deceleration is not larger than the deceleration threshold value, the second assist force is made equal to zero.

Subsequently, in a similar manner to the first embodiment, the second assist force is added to the first assist force to provide an added assist force by which the control unit 1-6 controls the electric power steering operation.

Figure 10:
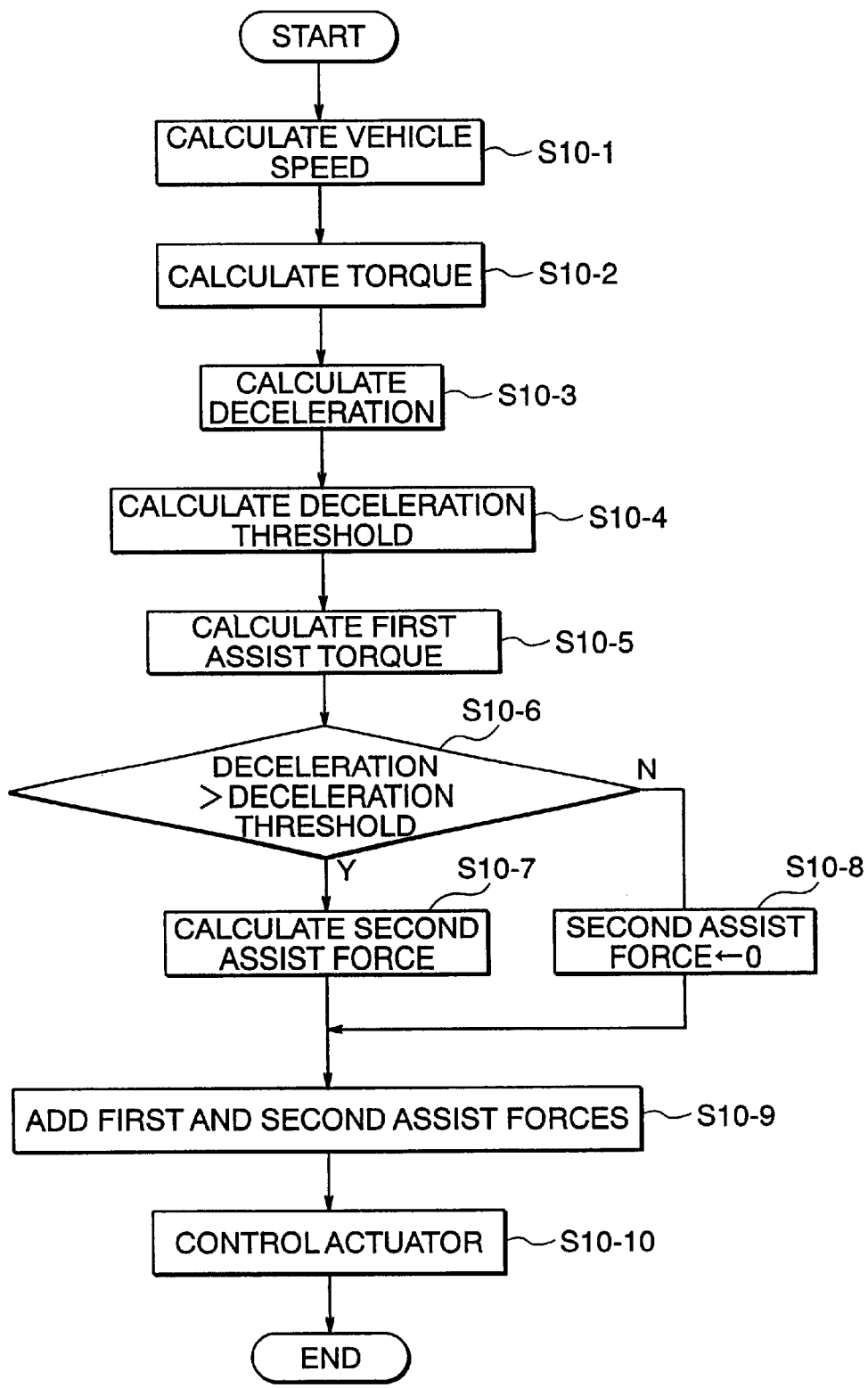
FIG. 10 is a flow chart for describing an operation of the electric power steering apparatus according to the fourth embodiment of the present invention.

Next, teh operation of the electric power steering apparatus according to this fourth embodiment will now be explained in accordance with a flow chart shown in FIG. 10.

First, the vehicle speed detecting unit 1-1 calculates the vehicle speed of the vehicle based upon an output signal derived from the vehicle speed sensor (in a step S10-1). The torque detecting unit 1-2 calculates a steering wheel torque of the vehicle based upon a an output signal derived from the torque sensor (in a step S10-2). The deceleration calculating unit 1-3 calculates a deceleration from the vehicle speed calculated at the previous step S10-1 (in a step S10-3). The deceleration is calculated based upon a change in the vehicle speed per unit time.

On the other hand, the deceleration threshold value calculating unit 8-1 calculates a deceleration threshold value by acquiring the calculated vehicle speed while referring to the map shown in FIG. 9 (in a step S10-4). The first assist force calculating unit 1-4 calculates a first assist force based upon the vehicle speed calculated in the step S10-1 and the steering torque calculated in the step S10-2 (in a step S10-5).

The second assist force calculation judging unit 8-2 compares the deceleration calculated in the step S10-3 with the deceleration threshold value calculated in the step S10-4 (in a step S10-6). At this time, when the deceleration is higher than the deceleration threshold value, the second assist force calculating unit 1-5 calculates a second assist force from the deceleration calculated in the step S10-3 (in a step S10-7), and then, the processing is advanced to a further step S10-9. To the contrary, when the deceleration is not higher than this deceleration threshold value, the second assist force calculating unit 1-5 sets the second assist force to zero (in a step S10-8), and then, the processing is advanced to a step S10-9.

After both the first assist force and the second assist force are calculated in the above-explained manner, these first and second assist forces are added to each other (in a step S10-9). It should be noted that when the deceleration is not higher than the deceleration threshold value, since the deceleration is equal to zero, the second assist force becomes equal to zero, and the calculation result in the step S10-9 is made of only the first assist force. However, if the deceleration is higher than the deceleration threshold value, then the control unit 1-6 controls to apply the auxiliary or assist force comprising the added value of the first and second assist forces to the steering wheel, to thereby increase the steering force.

Embodiment 5

Figure 11:
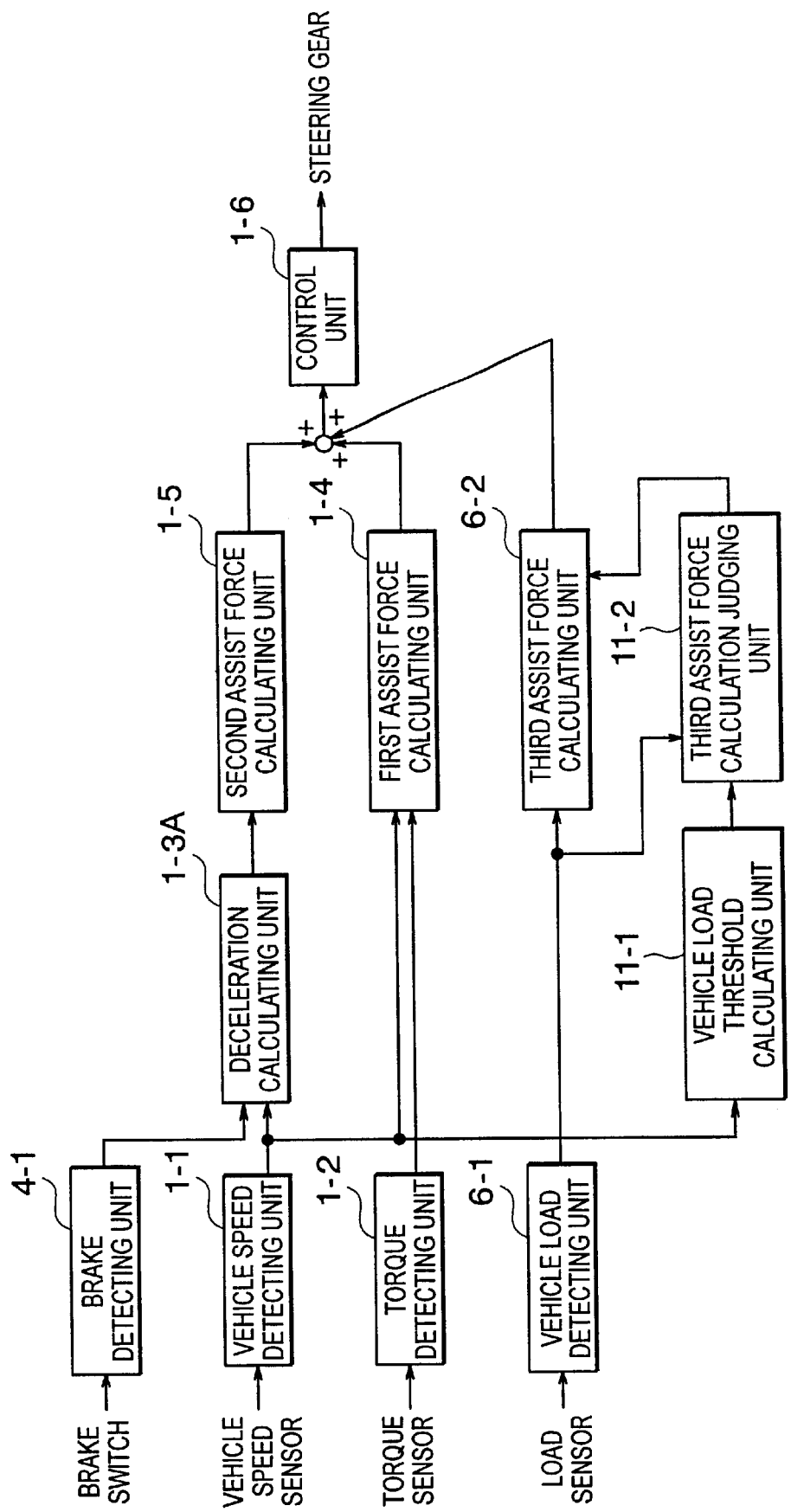
FIG. 11 is a structural diagram of an electric power steering apparatus according to a fifth embodiment of the present invention.

An electric power steering apparatus for a vehicle according to a fifth embodiment of the present invention will be described. FIG. 11 is a structural diagram of the electric power steering apparatus according to this embodiment. It should be noted that the same reference numerals used in FIG. 6 will be employed for designating the like or corresponding circuit components of this electric power steering apparatus.

Figure 12:
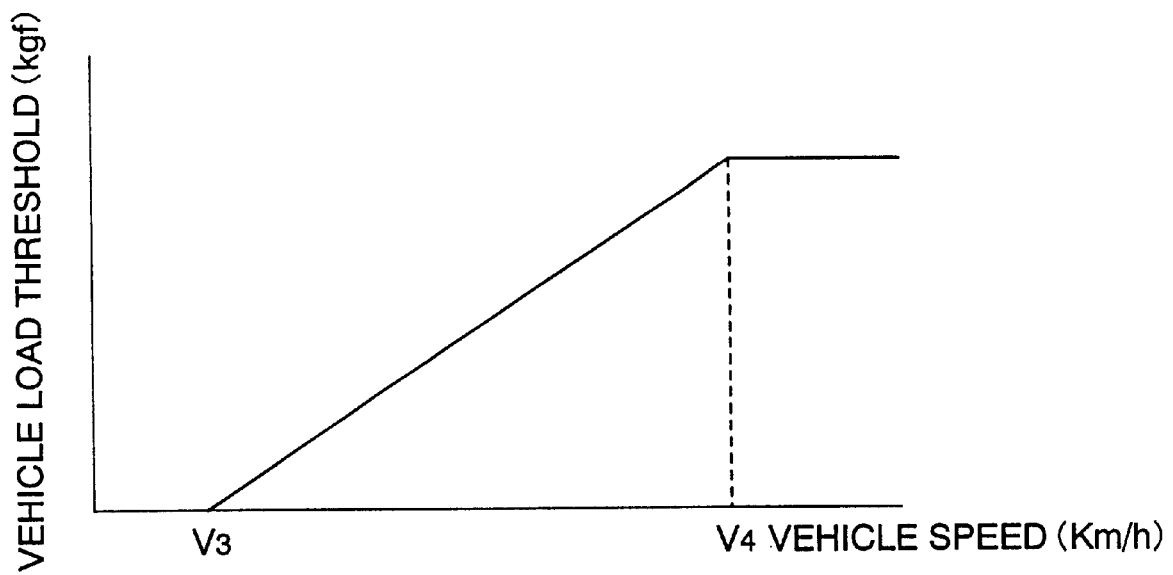
FIG. 12 is a graphic representation showing a map used to calculate a vehicle load threshold value of the electric power steering apparatus according to the fifth embodiment of the present invention.
Figure 13:
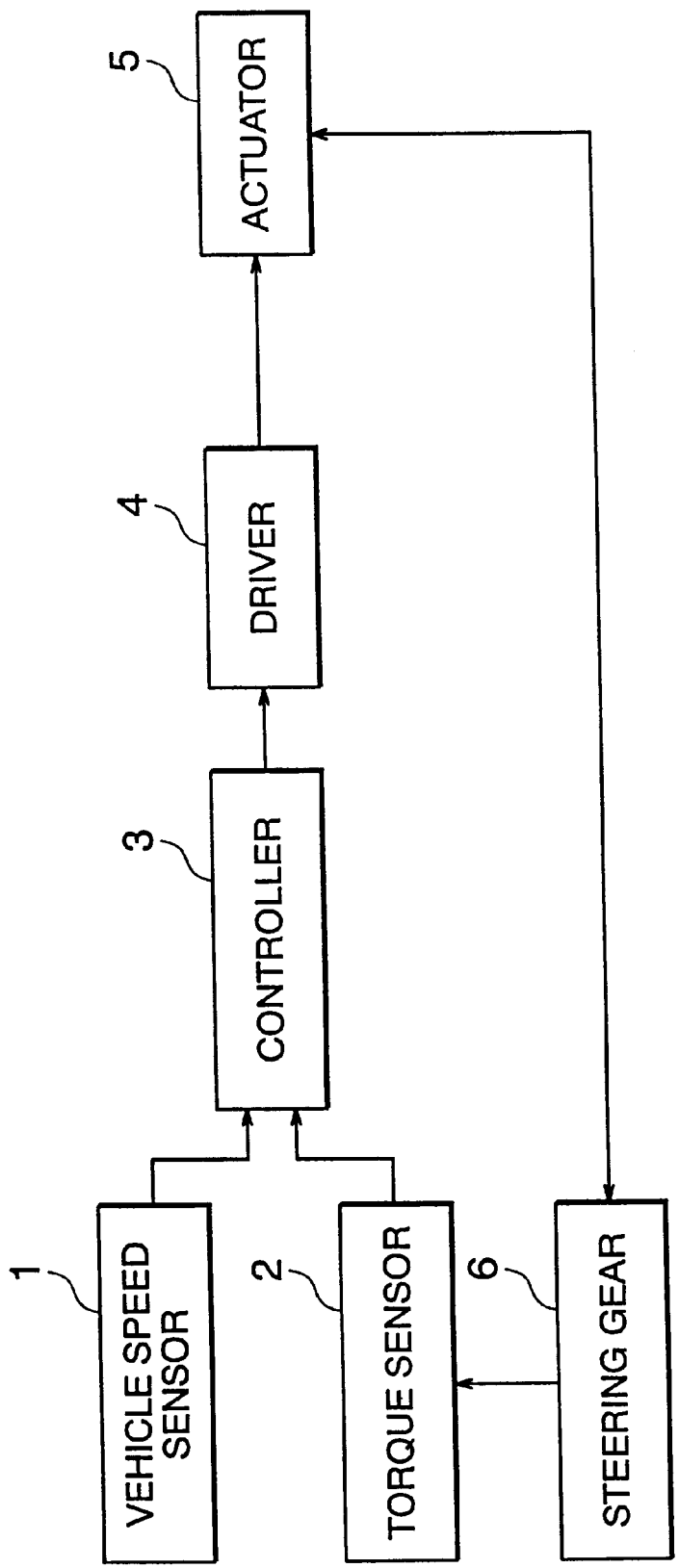
FIG. 13 is a schematic diagram of a conventional speed sensitive type electric power steering apparatus.
Figure 14:
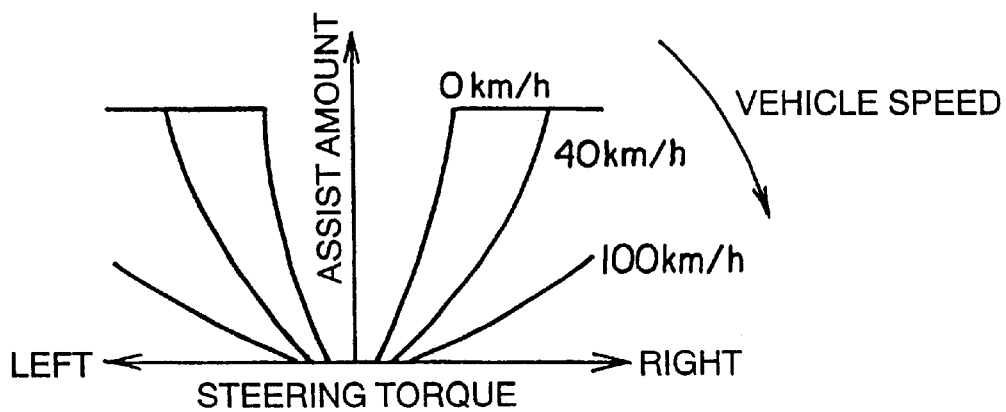
FIG. 14 is a diagram for explaining a power assist force of the conventional speed sensitive type electric power steering apparatus.

In FIG. 11, the electric power steering apparatus according to this embodiment includes, in addition to elements 1-1, 1-2, 1-3A, 1-4 through 1-6, 6-1, and 6-2 as shown in FIG. 6 of the third embodiment, a vehicle load threshold value calculating unit 11-1 for calculating a vehicle load threshold value from a vehicle speed detected by the vehicle speed detecting unit 1-1, and a third assist force calculation judging unit 11-2 to be described later. FIG. 12 represents an example of a map for calculating a vehicle load threshold value from the vehicle speed.

In FIG. 12, the higher the vehicle speed becomes, the larger the vehicle load threshold value becomes. As a result, when the vehicle is decelerated while running at a high speed, as the vehicle speed increases, the greater becomes the load on a front wheel of the vehicle required to increase the amount of steering assist force. Thus, at the time when the vehicle is running at a high speed at which the torque of the steering wheel is small, the steering assist force is not increased by a small change in the load, and hence the steering feeling or sensation can be improved.

The third assist force calculation judging unit 11-2 compares the vehicle load threshold value calculated by the vehicle load threshold value calculating unit 11-1 with a vehicle load detected by the vehicle load detecting unit 6-1 so as to judge whether or not a third assist force corresponding to the vehicle load is calculated based upon the below-mentioned judgement result:

vehicle load>vehicle load threshold value.

In the case where the vehicle load is larger than the vehicle load threshold value, the third assist force calculating unit 6-2 calculates a third assist force corresponding to the vehicle load while referring to the map as illustrated in FIG. 7 of the fifth embodiment. In this embodiment, the threshold value K1 set in FIG. 7 is set to the vehicle load threshold value calculated by the vehicle load threshold value calculating unit 11-1.

However, when the vehicle load is not larger than the vehicle load threshold value, the third assist force calculating unit 6-2 sets the third assist force to zero.

Embodiment 6

Although in the above-explained fifth embodiment, the third assist force calculation judging unit 11-2 judges as to whether or not calculation of the third assist force is required, by comparison of the detected vehicle load with the vehicle load threshold value. Alternatively, as represented in the fourth embodiment, it is possible to judge as to whether or not calculation of the second assist force is required based upon the calculated deceleration threshold value and the deceleration calculation result.

As described above, according to the present invention, there is provided an electric power steering apparatus for a vehicle for applying an assist force to a steering system so as to increase an operator's induced steering force, the apparatus comprising a vehicle speed detecting unit for detecting a speed of the vehicle, a torque detecting unit for detecting steering torque, a deceleration calculating unit for calculating a deceleration of the vehicle from the vehicle speed detected by the vehicle speed detecting unit, a first assist force calculating unit for calculating a first assist force from the detection results of the vehicle speed detecting unit and the torque detecting unit, a second assist force calculating unit for calculating a second assist force in response to the deceleration calculated by the deceleration calculating unit, and a control unit for applying to the steering system an assist force which is a sum of the first assist force calculated by the first assist force calculating unit and the second assist force calculated by the second assist force calculating unit. With this arrangement, even when the vehicle is decelerated, the vehicle can be steered under a stable condition, thus preventing the operator's steering operation of the steering wheel from being disturbed due to irregularities on a road surface, irrespective of an increase in the vehicle load or weight due to an increase in the total number of the passengers.

Preferably, the electric power steering apparatus may further comprise a brake detecting unit for detecting a braking operation by an operator of the vehicle, and when the brake detecting unit detects the braking operation by the operator, the deceleration calculating unit calculates the deceleration of the vehicle. Thus, when the vehicle is rapidly braked during which steerability of the steering wheel is greatly lowered, the steering assist force is increased, thereby providing the following effects. That is, it is possible to avoid disturbances of the steering operation of the steering wheel due to road surface irregularities, and also it is possible to achieve a stable steering operation.

Preferably, the electric power steering apparatus may further comprise a vehicle load detecting unit for detecting a vehicle load applied to a front wheel of the vehicle, and a third assist force calculating unit for calculating a third assist force in response to the vehicle load. The control unit applies to the steering system an assist force which is a total sum of the third assist force calculated by the third assist force, the first assist force and the second assist force. With this arrangement, when the vehicle is running under bad road conditions or on irregular road surfaces, the assist force is increased so as to lighten the steering weight of the steering wheel. As a result, it is possible to avoid disturbances of the operator's steering operation of the steering wheel due to the road surface irregularities, and also it is possible to achieve a stable steering operation.

Preferably, the electric power steering apparatus may further comprise a deceleration threshold value calculating unit for calculating a deceleration threshold value in response to a vehicle speed, and a second assist force calculation judging unit for judging as to whether or not the second assist force is to be added to the first assist force, based upon a comparison result between the deceleration calculated by the deceleration calculating unit and the deceleration threshold value calculated by the deceleration threshold value calculating unit. Thus, when the vehicle is running at a high speed at which the torque required to steer the steering wheel is reduced, the assist force is not increased even upon deceleration of the vehicle, so that the assist force can be set to a value suitable for the vehicle speed, and hence the steering feeling can be improved.

Preferably, the electric power steering apparatus may further comprise a vehicle load threshold value calculating unit for calculating a vehicle load threshold value in response to a vehicle speed, and a third assist force calculation judging unit for judging as to whether or not the third assist force is to be added to the sum of the first assist force and the second assist force based upon a comparison result between the vehicle load detected by said vehicle load detecting unit and the vehicle load threshold value calculated by said vehicle load threshold value calculating unit. With this arrangement, when the vehicle is running at a high speed at which the torque required to steer the steering wheel is reduced, the assist force is not increased even in the case where the vehicle load is increased due to irregularities on the road surface. As a result, it is possible to set the assist force to a value suitable for the vehicle speed, thus improving the operator's steering feeling.

What is claimed is:

1. An electric power steering apparatus for a vehicle for applying an assist force to a steering system so as to increase an operator's induced steering force, said apparatus comprising:
   a vehicle speed detecting unit for detecting a speed of said vehicle;
   a torque detecting unit for detecting steering torque;
   a deceleration calculating unit for calculating a deceleration of the vehicle from the vehicle speed detected by said vehicle speed detecting unit;
   a first assist force calculating unit for calculating a first assist force from the detection results of said vehicle speed detecting unit and said torque detecting unit;
   a second assist force calculating unit for calculating a second assist force in response to the deceleration calculated by said deceleration calculating unit; and
   a control unit for applying to said steering system said assist force which is a sum of said first assist force calculated by said first assist force calculating unit and said second assist force calculated by said second assist force calculating unit.

2. The electric power steering apparatus as claimed in claim 1, further comprising a brake detecting unit for detecting a braking operation by an operator of the vehicle, and wherein when said brake detecting unit detects the braking operation by the operator, said deceleration calculating unit calculates the deceleration of the vehicle.

3. The electric power steering apparatus as claimed in claim 1, further comprising:

a vehicle load detecting unit for detecting a vehicle load applied to a front wheel of the vehicle; and a third assist force calculating unit for calculating a third assist force in response to the vehicle load; and wherein said control unit applies to said steering system an assist force which is a total sum of said third assist force calculated by said third assist force, said first assist force and said second assist force.

4. The electric power steering apparatus as claimed in claim 1, further comprising:

a deceleration threshold value calculating unit for calculating a deceleration threshold value in response to a vehicle speed; and a second assist force calculation judging unit for judging as to whether or not the second assist force is to be added to the first assist force, based upon a comparison result between the deceleration calculated by said deceleration calculating unit and the deceleration threshold value calculated by said deceleration threshold value calculating unit.

5. The electric power steering apparatus as claimed in claim 3, further comprising:

a vehicle load threshold value calculating unit for calculating a vehicle load threshold value in response to a vehicle speed; and a third assist force calculation judging unit for judging as to whether or not the third assist force is to be added to the sum of the first assist force and the second assist force based upon a comparison result between the vehicle load detected by said vehicle load detecting unit and the vehicle load threshold value calculated by said vehicle load threshold value calculating unit.

* * * * *